United States Patent [19]

Wegscheid et al.

[11] 4,008,556
[45] Feb. 22, 1977

[54] ISOLATED HARVESTER CUTTER BAR

[75] Inventors: Edmund Lawrence Wegscheid, Milan, Ill.; Larry Wilson Cofer, Drakesville, Iowa

[73] Assignee: Deere & Company, Moline, Ill.

[22] Filed: Feb. 19, 1976

[21] Appl. No.: 659,574

[52] U.S. Cl. .................................. 56/12.6; 56/15.7
[51] Int. Cl.$^2$ .......................................... A01D 49/00
[58] Field of Search ................ 56/12.6, 14.3, 14.4, 56/DIG. 1, 15.8, 15.7, 257, 260, 306

[56] References Cited

UNITED STATES PATENTS 3,302,376   2/1967   Searnato et al. ................... 56/12.6

*Primary Examiner*—J. N. Eskovitz

[57] ABSTRACT

A pull-type mower conditioner type harvester has a mobile main frame carrying a vertically adjustable header or subframe which carries a plurality of harvesting components that extend between the opposite sides of the header, including a reciprocating sickle type cutter bar. The cutter bar includes a transverse support member that spans the width of the header and carries the cutter bar components, including a wobble type drive at one end of the cutter bar. The cutter bar is connected to the header by a pair of resilient mounting structures respectively connecting the opposite ends of the cutter bar to the opposite sides of the header, each mounting structure including a vertical, fore and aft link element that is connected to the header by a pair of fore and aft spaced rubber bushings and is connected to the cutter bar through a similar pair of fore and aft spaced rubber bushings that are respectively directly below the first pair of bushings, the mounting structure being relatively stiff in a fore and aft direction and in a vertical direction while being more flexible in a transverse or lateral direction to isolate vibrations due to the transverse or lateral reciprocating motion of the cutter bar sickle from the remainder of the harvester.

12 Claims, 4 Drawing Figures

ISOLATED HARVESTER CUTTER BAR

BACKGROUND OF THE INVENTION

This invention relates to a harvesting machine, and more particularly to a harvesting machine of the type having a reciprocating type cutter bar assembly that severs crop material from the field as the machine advances.

Such reciprocating type cutter bar assemblies have been more or less conventional on harvesting machines since the early days of mechanized agriculture. While such cutter bars have many advantages, one of the disadvantages of such cutter bars is the vibration produced by the reciprocating sickle of the cutter bar, with the attendant noise and machine wear produced by the vibration.

Recently there has been increasing concern for the noise levels produced by agricultural machines and their long-range harmful effect on machine operators, and in some instances, governmental regulations limit the noise levels to which a machine operator can be exposed.

SUMMARY OF THE INVENTION

According to the present invention, there is provided an improved mounting for a cutter bar on a harvesting machine that reduces the vibration transmitted from the cutter bar to the machine and consequently reduces the noise level of the machine during operation. The invention features the use of resilient mounts between the cutter bar and the machine frame on which it is mounted to isolate the cutter bar from the rest of the machine. More specifically, a resilient mounting structure is provided at opposite ends of the cutter bar for connecting the cutter bar to the opposite sides of the machine frame. Still more specifically, each mounting structure features the use of a pair of fore and aft spaced resilient mounts connecting a mounting link or element to the frame while a second pair of fore and aft spaced mounts connect the mounting link to the cutter bar.

An important feature of the invention resides in the fact that the mounting structure provides a relatively stiff mounting in both the fore and aft and the vertical directions to resist the rearward force on the cutter bar, that results from the forward movement of the machine and the engagement of the cutter bar with the crop material and the ground, and the upward forces on the cutter bar as a result of the cutter bar riding along the ground, while providing substantially less stiffness in a lateral or transverse direction to absorb the lateral forces on the cutter bar assembly as result of the lateral reciprocating movement of the cutter bar sickle, which produces the cutter bar vibrations.

Still another feature of the invention resides in the mounting of a drive mechanism for converting rotary to reciprocating motion on the end of the cutter bar so that the drive mechanism is also vibration isolated from the remainder of the machine.

DESCRIPTION OF THE PREFERRED EMBODIMENT

Figure 1:
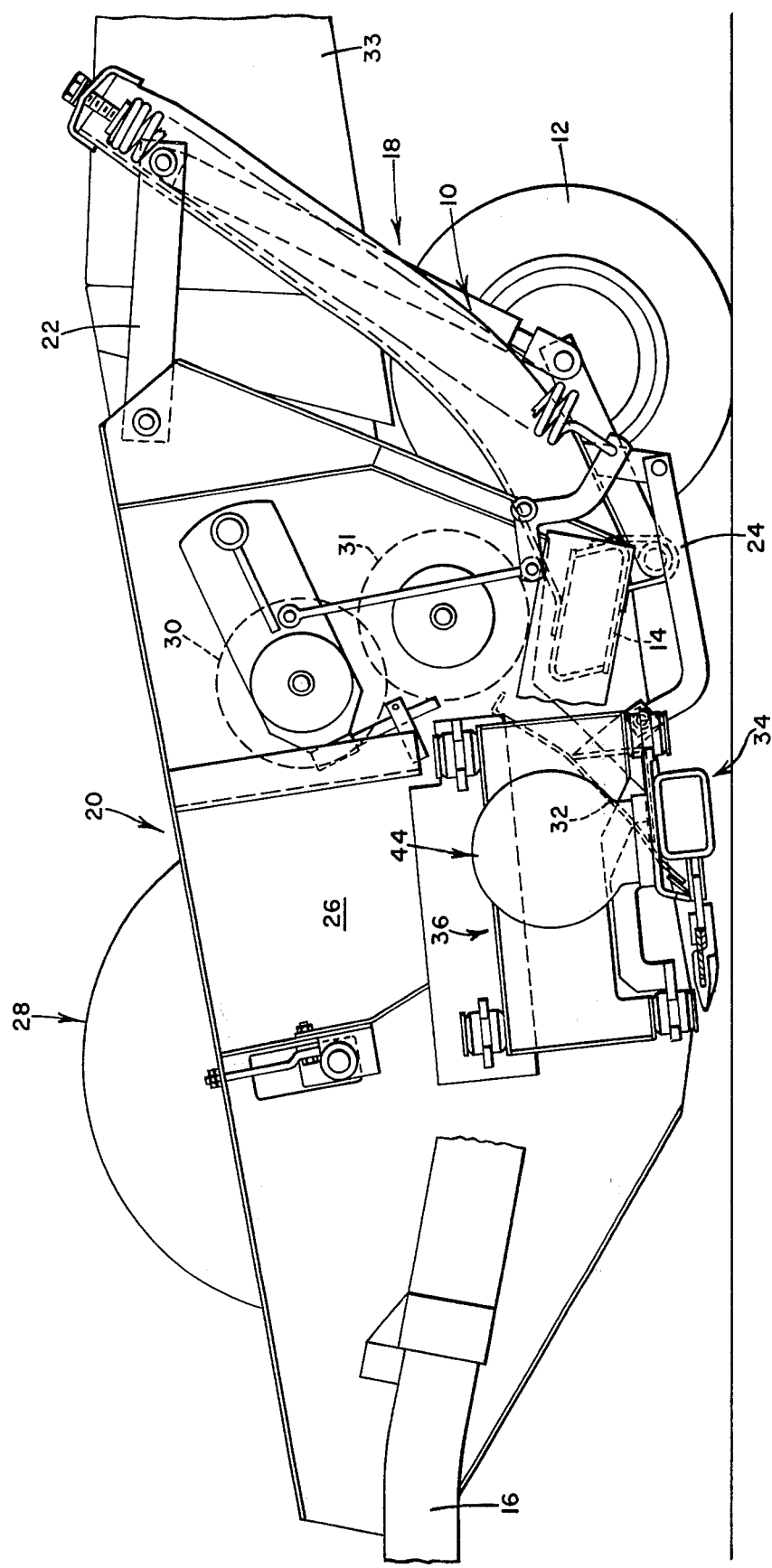
FIG. 1 is a side elevation view of a pull-type mower conditioner embodying the invention.

The invention is embodied in a harvesting machine of the type known as a mower conditioner, that includes a mobile main frame indicated generally by the numeral 10, the frame being mounted on a pair of rearwardly disposed wheels 12. The machine is a pull-type machine, and the main frame 10 is generally L-shaped and includes a transverse beam 14 and a fore and aft tongue 16 extending forwardly from the left end of the beam 14, only the rearward portion of the tongue being shown in the drawings. As is well known, the forward end of the tongue is connected to a towing tractor, which also supplies power for machine through a fore and aft PTO drive shaft (not shown). The frame 10 is mounted on the wheels by means of a suspension system, indicated generally by the numeral 18, which provides for positioning the frame between a lowered operating position and a raised transport position. The general construction of the machine and the construction and operation of the suspension system are shown and described in greater detail in U.S. Pat. No. 3,797,207, which is also assigned to the assignee herein.

As is well known, such machines include a forward vertically adjustable header or subframe 20, which carries the harvesting components, the header 20 being suspended from the main frame 10 for vertical adjustment relative thereto by a pair of upper links 22 and a pair of lower links 24. As is also well known, the header or subframe has opposite sides formed by a pair of vertical fore and aft side walls 26, and a harvesting reel 28 extends between the opposite side walls 26 immediately in front of a pair of crop conditioning rolls 30 and 31, which also span the width of the header. The reel 28 moves the crop material up an upwardly and rearwardly inclined ramp 32 into the bite of the opposite rotating conditioner rolls 30 and 31, which discharge the crop material rearwardly against window-forming shields 33 that deflect the material onto the ground and into a window. Spanning the width of the header immediately in front of the ramp 32 and below the reel 28 is a cutter bar assembly 34, that is mounted on the opposite header or subframe sides 26 by means of a pair of resilient mounting structures or mounting means indicated generally by the numeral 36.

The cutter bar assembly itself is more or less conventional and includes a transverse support member or beam 38 that extends the width of the cutter bar assembly 34. A plurality of fore and aft mower guards 40 are mounted on and extend forwardly from the support member 38 at closely spaced intervals and include ledger surfaces with which a transverse sickle bar 42 registers, the sickle bar 42 reciprocating in a lateral or transverse direction to sever the crop material moving rearwardly relative to the mower guards as the machine advances. A wobble type drive mechanism 44 is mounted on the left hand end of the support member 38, and as is well known, such mechanisms include a rotary input element, in this case a drive sheave 46 driven by a drive belt 48, which, in turn, is driven through the drive system on the machine in the well known manner. As is also well known, the drive mechanism 44 includes an oscillating output element 50 that oscillates about a vertical axis and is connected to the left end of the sickle 42 to reciprocate the sickle in a transverse direction. A typical sickle speed or oscillation frequency is 1650 strokes per minute through a 3-inch stroke, and, as is apparent, the reciprocation of the sickle bar causes a substantial vibration in the entire cutter bar assembly having the same frequency as the oscillating frequency of the sickle.

The mounting structures 36 at the opposite ends of the cutter bar assembly 34 are substantially identical except for the fact that they are mirror images of one another, each mounting structure including an upright, fore and aft plate-like mounting link or element 52 having laterally extending flanges 53 and 54 along its upper and lower edges respectively. The upper flange 53 is connected to the header sidewall 26 through a pair of fore and aft spaced resilient mounts 55 and 56, the mounts 55 and 56 respectively extending through apertured ears 58 that extend outwardly from an upright plate 60 attached to the sidewall 26. A pair of similar fore and aft spaced resilient mounts 62 and 64 are connected to the lower flange 54 of the mounting link 52 and extend through a pair of horizontal apertured ears 66 attached to a lower mounting bracket 68, which is rigidly connected to the cutter bar support member 38.

Figure 4:
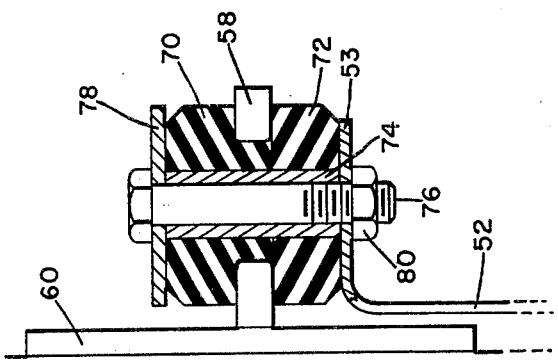
FIG. 4 is an enlarged axial section through one of the resilient cutter bar mounts.

The construction of the resilient mounts 55, 56, 62 and 64 is well known and is shown in greater detail in FIG. 4, each mounting including upper and lower rubber bushings 70 and 72 that respectively engage the upper and lower surfaces of the mounting ears 58 or 66, the upper bushing having a reduced diameter portion that extends through the aperture in the ear. A metal sleeve 74 extends through the bushings and the bushings are clamped to the ears by bolts 76 that extends downwardly through an annular plate 78 on top of the upper bushing, through the sleeve 74 and through the flange 53, a nut 80 being threadable on the lower end of the bolt to clamp the flange to the lower bushing and also clamp the bushings 70 and 72 into engagement with the mounting plate ears 58. While only the upper bushings are shown in FIG. 4, it is understood that the lower bushings are identical and function in the same manner.

In operation, as the machine advances the reel 28 sweeps the crop toward the cutter bar 34, which normally rides along the ground and severs the crop material from the field, the reel sweeping the severed crop material upwardly and rearwardly along the ramp 32 to the bite of the conditioner rolls 30 and 31, which condition the crop as it passes between the rolls and discharge the conditioned crop against the windrower shields, which deflect the crop material toward the ground into a window. The reciprocating sickle 42 sets up a vibration in the cutter bar assembly 34. However, the resilient mounting structure that mounts the cutter bar assembly on the header or subframe isolates the cutter bar assembly so that the vibration therein is not transmitted to the rest of the machine.

Figure 3:
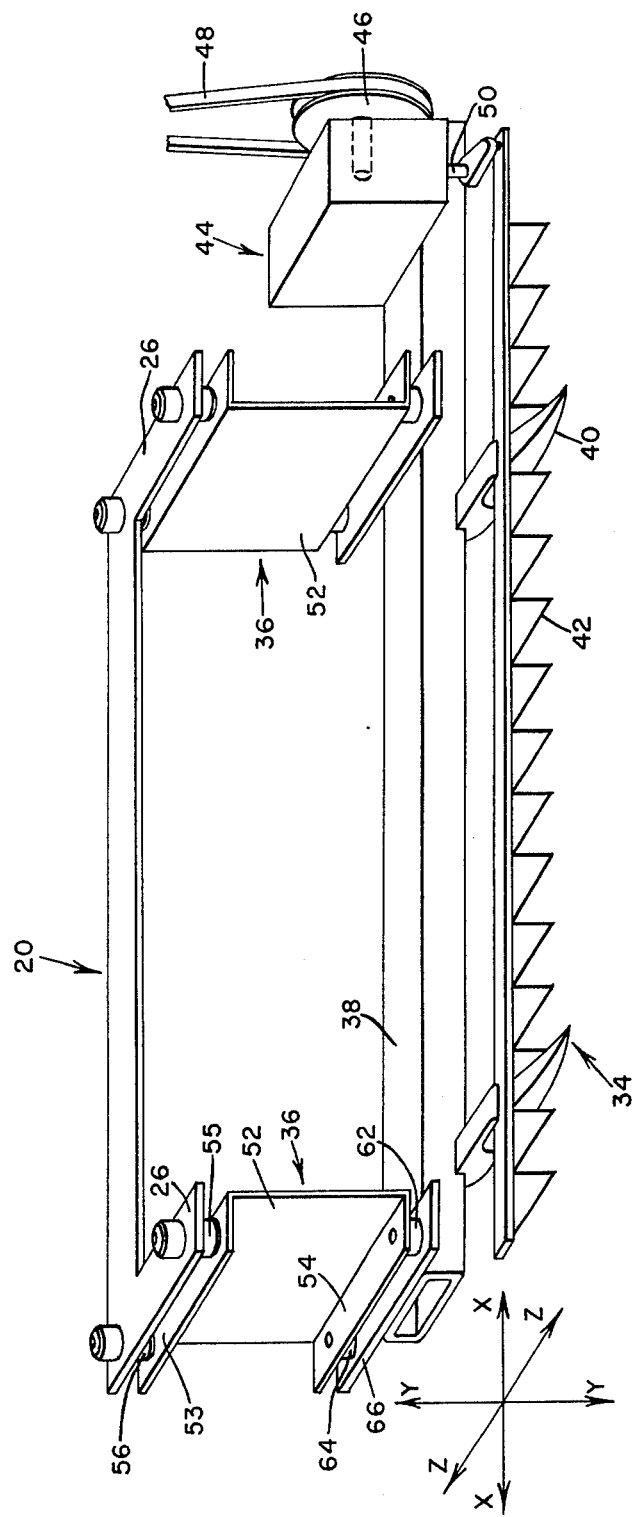
FIG. 3 is a schematic perspective view of the cutter bar assembly and the mounting therefor.

The particular arrangement of the mounting structure is such that it absorbs the cutter bar assembly vibration while still providing a relatively strong and rigid mount for the cutter bar assembly. The force on the cutter bar assembly can be divided between lateral or transverse forces, the direction of which is indicated by the line X—X in FIG. 3, vertical forces in the direction indicated by the line Y—Y in FIG. 3, and fore and aft forces in the direction indicated by the line Z—Z. The vibration forces are primarily along the lateral or X axis. However, the two mounting structures 36, the cutter bar, and the frame form a rectangle in the X axis with resilient or flexible connections at each corner, so that the overall structure easily distorts in either lateral direction into a parallelogram. Thus, the mounting of the cutter bar can be described as soft or relatively flexible in a lateral direction, which provides for good absorption of the lateral vibration forces.

Figure 2:
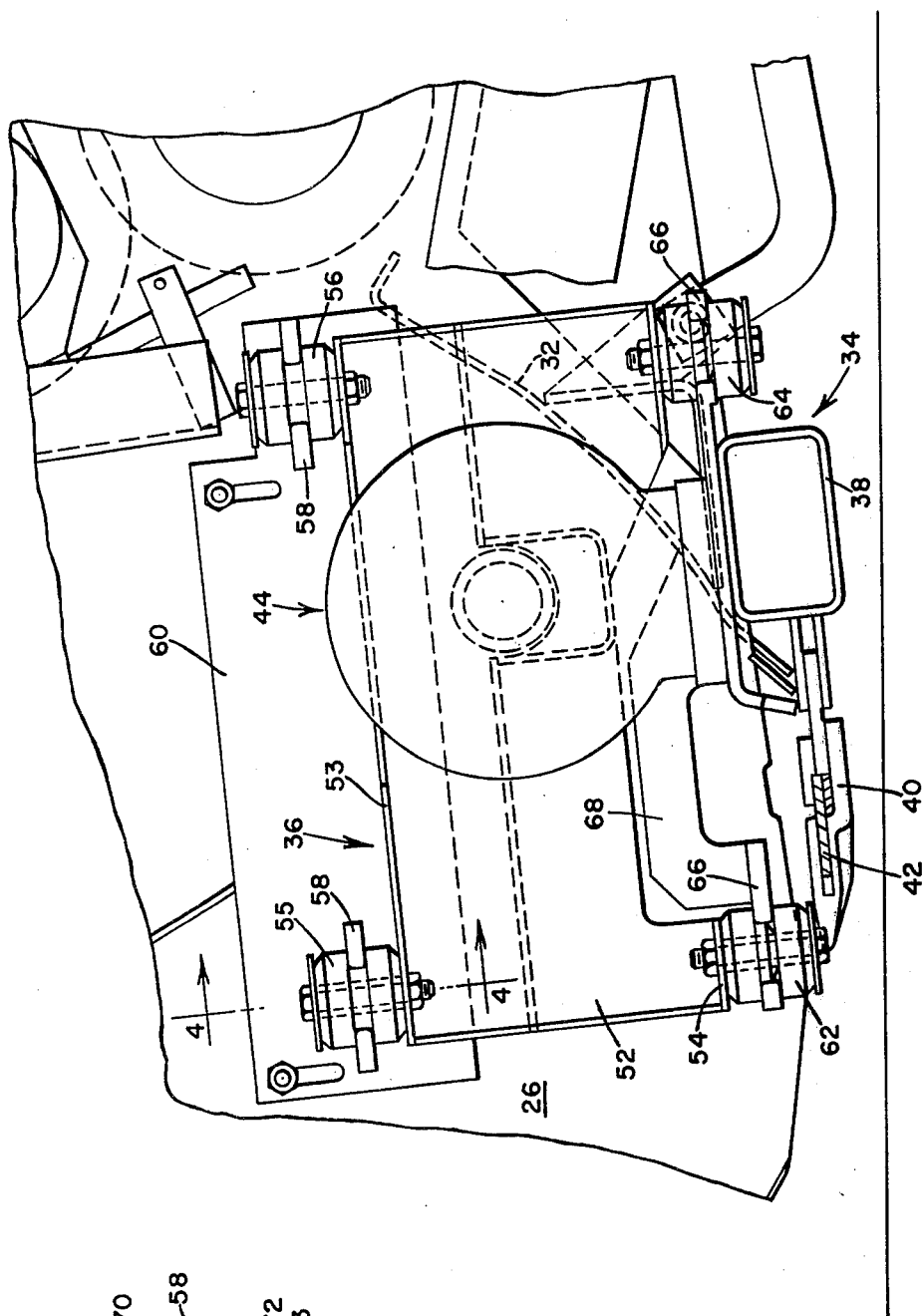
FIG. 2 is an enlarged side elevation view of the cutter bar assembly and the mounting therefor on the mower conditioner shown in FIG. 1.

However, the cutter bar is subjected to both vertical loading, as result of the weight of the header and reaction with the ground along the Y axis, and fore and aft loading, as result of engagement of the cutter bar assembly with the ground and the crop material as the machine advances, which loading is along the Z axis. However, when the cutter bar is loaded along the Z axis, it is apparent that the forces on the cutter bar would tend to rotate the cutter bar assembly in a counterclockwise direction, as viewed in FIG. 2, so that the rear upper mounts 56 would be in compression while the front upper mounts 55 would be in tension. In either case, the mounts are relatively rigid, so that the mounting structure is relatively rigid in a fore and aft direction. The above stiffness in the fore and aft direction or along the Z axis is desirable to resist the loads on the cutter bar. Similarly, the upward forces on the cutter bar assembly along the X axis would place all the mounts in compression, and again the mounts are relatively stiff in compression so that the cutter bar assembly does not deflect to a very great degree relative to the header as a result of the vertical loading. Thus, the mounting structure provides a mount that is soft in regard to the vibration inducing loads to absorb the vibration, while relatively stiff or rigid with regard to other normal loadings on the cutter bar assembly during its operation to provide a strong and durable mounting for the cutter bar assembly. As is also apparent, the mounting of the wobble type cutter bar drive on the cutter bar assembly accommodates the movement of the cutter bar assembly relative to the rest of the header without any type of compensating linkage between the drive and the sickle, the relative movement being taken up in the drive belt 48.

It has been found that the above isolation of the cutter bar assembly has resulted in a substantial reduction of the noise level generated by the machine, while not affecting its operating efficiency or durability. In fact, the durability would be improved due to the lessening of vibration in the remainder of the machine and the shock absorbing characteristics of the rubber mounts which would reduce the shock loads on the rest of the machine when the cutter bar assembly strikes rocks or other obstructions during operation.

We claim:

1. In a harvesting machine having a mobile frame including a subframe with opposite lateral sides, the combination therewith of an improved cutting apparatus and means for mounting the apparatus on the frame comprising: a cutter bar assembly extending between the opposite frame sides and including a transverse support member and a laterally reciprocating cutting element mounted on the support member and operative to sever crop material from the field as the machine advances; a pair of resilient mounting means operatively connecting the opposite ends of the cutter bar assembly to the opposite frame sides to at least partially isolate vibration of the cutter bar assembly from the frame; and drive means drivingly connected to the cutting element for reciprocating said cutting element.

2. The invention defined in claim 1 wherein each resilient mounting means is operative to resist fore and aft deflection of the cutter bar assembly relative to the frame to a greater degree than in a lateral direction.

3. The invention defined in claim 2 wherein the mounting means are operative to resist generally vertical deflection of the cutter bar assembly relative to the frame to a greater degree than in a lateral direction.

4. The invention defined in claim 3 wherein each mounting means includes a generally fore and aft link element disposed adjacent to the frame side, a first resilient connecting means operatively connecting the upper end of the link element to the frame side and a second resilient connecting means operatively connecting the lower end of the link element to the cutter bar assembly.

5. The invention defined in claim 4 wherein the first connecting means includes a pair of fore and aft spaced upper resilient mounts, the forward mount being stressed in tension and the rearward mount in compression as a result of rearward forces on the cutter bar assembly.

6. The invention defined in claim 5 wherein the second connecting means includes a pair of fore and aft spaced resilient mounts respectively disposed in general vertical alignment with the uper mounts.

7. The invention defined in claim 6 wherein the drive means includes a wobble drive unit mounted on one end of the support member and having a rotary input element with a reciprocating output element connected to the cutting element.

8. The invention defined in claim 1 wherein the drive means includes a wobble drive unit mounted on one end of the support member and having a rotary input element with a reciprocating output element connected to the cutting element.

9. In a harvesting machine having a mobile frame including a subframe with opposite lateral sides, the combination therewith of an improved cutting apparatus and means for mounting the apparatus on the frame comprising: a cutter bar assembly extending between the opposite frame sides and including a transverse support member and a laterally reciprocating cutting element mounted on the support member and operative to sever crop material from the field as the machine advances; a pair of resilient mounting means operatively connecting the opposite ends of the cutter bar assembly to the opposite frame sides to at least partially isolate vibration of the cutter bar assembly from the frame, each mounting means including a generally fore and aft link element disposed adjacent to the frame side, a first resilient connecting means operatively connecting the upper end of the link element to the frame side and a second resilient connecting means operatively connecting the lower end of the link element to the cutter bar assembly.

10. The invention claimed in claim 9 wherein the first connecting means includes a pair of resilient mounts spaced in a fore and aft direction and the second connecting means includes a second pair of resilient mounts respectively disposed generally below the first pair of mounts.

11. In a harvesting machine having a mobile frame including a subframe with opposite lateral sides, the combination therewith of an improved cutting apparatus and means for mounting the apparatus on the frame comprising: a cutter bar assembly extending between the opposite frame sides and including a transverse support member, and a laterally reciprocating cutting element mounted on the support member and operative to sever crop material from the field as the machine advances; a pair of resilient mounting means operatively connecting opposite ends of the cutter bar assembly to the opposite frame sides to at least partially isolate vibration of the cutter bar assembly from the frame, the mounting means being operative to resist fore and aft deflection of the cutter bar and vertical deflection of the cutter bar relative to the frame to a greater degree than in a lateral direction to absorb the lateral vibration while providing a relatively stiff resistance to other forces acting on the cutter bar assembly during operation; and drive means drivingly connected to the cutting element for reciprocating said cutting element.

12. The invention defined in claim 11 wherein each mounting means includes a generally fore and aft upright link element disposed adjacent to the frame side, a first resilient connecting means operatively connecting the upper end of the link element to the frame side and a second resilient connecting means operatively connecting the lower end of the link element to the cutter bar assembly.

* * * * *